3,317,473
CURING PHENOL-BENZALDEHYDE RESINS WITH A POLYAZIRIDINE

Richard A. Ploeger, Freeland, and Walter E. F. Ruprecht, Midland, Mich., assignors to The Dow Chemical Company, Midland, Mich., a corporation of Delaware
No Drawing. Filed June 29, 1964, Ser. No. 378,941
8 Claims. (Cl. 260—55)

This invention relates to the curing of phenol-benzaldehyde resins with polyaziridines. More particularly, the invention relates to a thermoset resin and to the method of preparing it from a thermoplastic phenol-benzaldehyde resin.

Phenolic compounds can be condensed with various aldehydes to obtain resins having properties which make them particularly suitable for some uses. Phenol reacts with benzaldehyde to produce a substantially linear resin composed of recurring groups having the following general formula

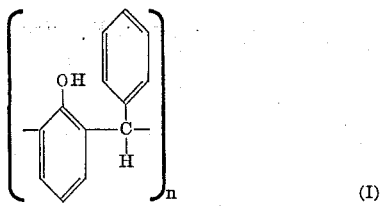

where $n$ can have an average value up to about 35, depending upon the reaction conditions used to produce the resin.

These resins are thermoplastic owing to their generally linear structure; however, they can be cured by further reaction with benzaldehyde to obtain a thermoset product. Thermosetting of these resins in this manner has not been practical for the reason that several hours, typically more than 12 hours, are required to effect a satisfactory cure.

According to this invention, thermoplastic phenol-benzaldehyde resins can be cured by reaction with a polyaziridine in a significantly shorter time than is required for curing with benzaldehyde.

The polyaziridines which can be used in the curing of these resins are those compounds having molecular structures which include at least two aziridinyl groups of the following structure in the molecule:

Some of the polyaziridinyl compounds which can be used as curing agents for the phenol-benzaldehyde resins are: the aryl and alkyl bis(1-aziridinyl)phosphinates and phosphino thionates; p,p-bis(1-aziridinyl)-N,N-diaryl and alkyl phosphinic amides and phosphino thioic amides; tris (1-aziridinyl)phosphine oxide and sulfide; 2,4-bis(1-aziridinyl)-6-alkoxy-sym.-triazines; 2,4-bis(1-aziridinyl)-6-di-(aryl or alkyl) amino-sym.-triazine; and tris-2,4,6-(1-aziridinyl)-sym.-triazine.

These rapid curing resin systems are particularly useful in the preparation of prepregs and laminates. Fibrous materials such as glass fibers, asbestos, and the like can be impregnated with a solution of the thermoplastic phenol-benzaldehyde and polyaziridine in a volatile solvent such as acetone. The fibrous material can be pretreated with one of the common finishes which are commercially available such as Volan A, A-1100, Z-6020, etc., to promote an improved bond between the fibers and the resin. The solvent is then evaporated from the impregnated fibers, as by air drying, to provide a dry, non-tacky material. In the event the melting point of the prepreg is too low to permit pressure curing without excessive loss of resin from the fabric, the prepreg can be B-staged at about 250° F. for 5–10 minutes.

The rapid curing time of thermoset resins produced according to this invention can be illustrated by reference to the following examples.

EXAMPLE 1

A resinous mixture of the following materials was prepared: 413 parts of phenol-benzaldehyde resin; 118 parts of tris(1-aziridinyl) phosphine oxide; 30 parts of ethanol; and 337 parts of acetone. These components were mixed, producing a solution having a solids content of 57.5 percent and a Gardner-Holdt viscosity of A–2.

A web of woven 181 style glass fibers finished with an epoxy terminated silane coupling agent (Dow Corning Z-6040) was impregnated with the resin solution. The impregnated web was air dried to remove the solvents, producing a prepreg which contained 35–42 percent resin.

Sheets of the prepreg were laminated by first warming the sheets for 0.5 minute in a press at 300° F. with no pressure applied then applying 250 lbs./sq. in. pressure to the laminate for 20 minutes while the press temperature was maintained at 300° F. The laminate was given a post cure at this temperature and pressure for an additional 10 minutes followed by a 350° F. cure for 20 minutes.

EXAMPLE 2

Another portion of the phenol-benzaldehyde resin used in Example 1 was cured with benzaldehyde using the following formulation:

300 parts by weight of phenol-benzaldehyde resin;
300 parts of benzaldehyde; and
257 parts of acetone.

This resin mixture was used to produce a prepreg with a web of 181 style of glass fibers having a Volan A finish.

The properties of laminates prepared according to Examples 1 and 2 are presented in Table I.

TABLE I.—PROPERTIES OF CURED LAMINATES

| Example | 1 | 2 |
|---|---|---|
| Laminate: | | |
| Resin Content, percent | 31.9 | 33.5 |
| Number of Plies | 14 | 12 |
| Laminate Thickness, inches | 0.124 | 0.115 |
| B-Staged at 250° F., Time | 0 | 4 hrs. |
| Cure: | | |
| Press Temp., ° F | 300 | 300 |
| Warm-up Time, minutes | 0.5 | 4 |
| Primary Cure at 250 p.s.i., minutes | 20 | 30 |
| Post Cure Schedule: | | |
| At 300° F | 10 min. | 15 min. |
| At 350° F | 20 min. | 3 hrs. |
| Flexural Properties, p.s.i.: | | |
| At Room Temperature | 76,933 | 17,500 |
| At 300° F. after 30 min. at 300° F | 23,833 | 3,653 |
| Compressive Properties, p.s.i.: | | |
| At Room Temperature | 35,233 | 4,652 |
| At Room Temperature after 2 hrs. Water Boil | 35,833 | 3,940 |
| At 300° F. after 30 min. at 300° F | 8,640 | 1,137 |

Comparing the data of Table I it can be seen that the laminate prepared in Example 1 using the polyaziridine as the curing agent has properties superior to those of the resin cured with benzaldehyde. The total curing time, including B-staging time and warm-up for the polyaziridine cure was 50.5 minutes whereas the benzaldehyde cured product required 7 hours and 49 minutes. Even at this longer curing time for the latter product, its poor physical properties indicate the cure was incomplete.

The relative proportion of the phenol-benzaldehyde resin to the polyaziridine is preferably the stoichiometric amount required to furnish one aziridinyl group for each molecule of the thermoplastic resin, however, mixtures wherein the ratio of the resin molecules to aziridinyl equivalents is from 0.5:1 to 2:1 may be used to advantage.

Although this invention can be practiced using phenol-benzaldehyde resins having a molecular structure corresponding to Formula I wherein the average value of $n$ is as high as 35, those resins having an average $n$ value in the range from about 5 to about 25 are preferred.

In addition to the use of these novel resins in laminates, they also have utility as potting or molding resins as well as solvent-applied coatings which can be cured by baking after solvent removal.

We claim:

1. A thermosettable mixture comprising a thermoplastic phenol-benzaldehyde resin and a polyaziridinyl compound.
2. A thermosettable mixture according to claim 1 wherein said polyaziridinyl compound is tris(1-aziridinyl)phosphine oxide.
3. A thermosettable mixture according to claim 1 wherein said mixture contains from about 0.5 to about 2 molecular equivalents of said phenol-benzaldehyde resin per aziridinyl equivalent.
4. A thermosettable mixture according to claim 2 containing approximately one aziridinyl equivalent per molecular equivalent of said phenol-benzaldehyde resin.
5. A prepreg produced by impregnating a fibrous material with a solution of a thermosettable mixture according to claim 1, then air drying said impregnated material and heating at a temperature near 250° F. until said thermosettable mixture has cured to a B-stage.
6. A prepreg produced by impregnating a fibrous material with a solution of a thermoplastic phenol-benzaldehyde resin and tris(1-aziridinyl)phosphine oxide in a volatile solvent, said solution containing approximately one aziridinyl equivalent per molecular equivalent of said phenol-benzaldehyde resin, then evaporating said solvent from said impregnated fibrous material and heating at a temperature near 250° F. until said thermosettable mixture has cured to a B stage.
7. The method of curing a thermoplastic phenol-benzaldehyde resin comprising mixing a quantity of said thermoplastic resin with a quantity of a polyaziridinyl compound which provides from about 0.5 to about 2.0 aziridinyl groups per molecule of thermoplastic resin.
8. The method of claim 7 wherein said polyaziridinyl compound is tris(1-aziridinyl)phosphine oxide.

No references cited.

WILLIAM H. SHORT, *Primary Examiner.*

H. E. SCHAIN, *Assistant Examiner.*